United States Patent
Popken et al.

(10) Patent No.: US 9,446,559 B2
(45) Date of Patent: Sep. 20, 2016

(54) SPEAKER TERMINALS

(71) Applicant: Sonos, Inc., Santa Barbara, CA (US)

(72) Inventors: Ian Popken, Newburyport, MA (US); Anthony Ferraro, North Reading, MA (US); Richard Warren Little, Santa Barbara, CA (US); Brandon Holley, Brookline, MA (US)

(73) Assignee: Sonos, Inc., Santa Barbara, CA (US)

( * ) Notice: Subject to any disclaimer, the term of this patent is extended or adjusted under 35 U.S.C. 154(b) by 82 days.

(21) Appl. No.: 14/490,625

(22) Filed: Sep. 18, 2014

(65) Prior Publication Data

US 2016/0088395 A1 Mar. 24, 2016

(51) Int. Cl.
| | | |
|---|---|---|
| *H04R 1/02* | (2006.01) | |
| *H04R 31/00* | (2006.01) | |
| *B29D 12/00* | (2006.01) | |
| *B29K 101/00* | (2006.01) | |
| *H04R 3/00* | (2006.01) | |

(52) U.S. Cl.
CPC .............. *B29D 12/00* (2013.01); *H04R 1/025* (2013.01); *B29K 2101/00* (2013.01); *H04R 3/00* (2013.01); *H04R 31/006* (2013.01); *H04R 2420/09* (2013.01)

(58) Field of Classification Search
CPC ...... H04R 9/02; H04R 9/022; H04R 31/006; B29D 12/00; B29D 12/02; B29D 15/00; B29D 16/00; B29K 2101/00; B29K 2101/10; B29K 2101/12
See application file for complete search history.

(56) References Cited

U.S. PATENT DOCUMENTS

| | | | | |
|---|---|---|---|---|
| 4,465,905 A | * | 8/1984 | Nation | H04R 1/24 381/386 |
| 4,565,905 A | * | 1/1986 | Nation | H04R 1/24 381/182 |
| 4,672,675 A | * | 6/1987 | Powell | H04R 9/063 381/182 |
| 4,979,220 A | * | 12/1990 | Chen | H04R 1/025 381/403 |
| 5,133,018 A | | 7/1992 | Miyazaki | |
| 5,757,945 A | * | 5/1998 | Sakamoto | H04R 9/06 381/400 |
| 5,850,462 A | * | 12/1998 | Sakamoto | H04R 1/06 381/404 |
| 6,208,743 B1 | | 3/2001 | Marten et al. | |
| 6,244,904 B1 | | 6/2001 | Fabian et al. | |
| 6,440,076 B1 | | 8/2002 | Sudol et al. | |
| 7,447,327 B2 | | 11/2008 | Kitamura et al. | |
| 7,575,439 B2 | | 8/2009 | Chen et al. | |
| 8,031,896 B2 | | 10/2011 | Chick et al. | |
| 8,031,897 B2 | | 10/2011 | Bastyr et al. | |
| 8,189,841 B2 | | 5/2012 | Litovsky et al. | |
| 8,345,892 B2 | | 1/2013 | Jung et al. | |
| 8,638,968 B2 | | 1/2014 | Gladwin | |
| 8,675,899 B2 | | 3/2014 | Jung | |
| 8,811,648 B2 | | 8/2014 | Pance et al. | |

(Continued)

*Primary Examiner* — Fan Tsang
*Assistant Examiner* — Angelica M McKinney
(74) *Attorney, Agent, or Firm* — McDonnell Boehnen Hulbert & Berghoff LLP

(57) ABSTRACT

Embodiments for speaker terminals of a speaker assembly are provided. The speaker terminals may include a first rigid conductive structure having (i) a first input terminal configured to couple to a first output of an audio source and (ii) a first output terminal configured to couple to a first input of a voice coil, and a second rigid conductive structure having (i) a second input terminal configured to couple to a second output of the audio source and (ii) a second output terminal configured to couple to a second input of the voice coil. A speaker basket is molded about at least a portion the first rigid conductive structure and at least a portion of the second rigid conductive structure. Such a speaker basket having molded within the speaker terminals may be a component in a speaker assembly.

20 Claims, 4 Drawing Sheets

(56) References Cited

U.S. PATENT DOCUMENTS

| | | |
|---|---|---|
| 8,934,657 B2 | 1/2015 | Wilk |
| 9,363,593 B2 | 6/2016 | Kawka et al. |
| 2001/0017930 A1* | 8/2001 | Matsudo ............... H04R 11/00 381/412 |
| 2004/0091121 A1* | 5/2004 | Morimoto ............... H04S 1/005 381/74 |
| 2005/0254680 A1* | 11/2005 | Kitamura ............... H04R 1/06 381/396 |
| 2006/0098838 A1* | 5/2006 | Yoo ............... H04R 1/06 381/398 |
| 2009/0147984 A1* | 6/2009 | Ando ............... H04R 25/407 381/396 |
| 2012/0121092 A1 | 5/2012 | Starobin |
| 2013/0202149 A1 | 8/2013 | Yoon |
| 2013/0315429 A1 | 11/2013 | Parker et al. |

* cited by examiner

SPEAKER TERMINALS

FIELD OF THE DISCLOSURE

The disclosure is related to consumer goods and, more particularly, to methods, systems, products, features, services, and other elements directed to media playback or some aspect thereof.

BACKGROUND

In some media playback devices, a speaker is driven when an audio signal is provided from an audio source to the speaker via wires connecting the audio source to a voice coil of the speaker. In such media playback devices, a durability of the media playback device may depend on a reliable connection of the wire between the voice coil and the audio source.

Additionally, an electromagnetic field is created around the wires whenever an audio signal passes through the wires. The electromagnetic field may disrupt operations of other components, such as a wireless communication interface. Accordingly, a reliability of the media playback device may depend on an ability to account for the electromagnetic field created around the wires when designing the media playback system.

BRIEF DESCRIPTION OF THE DRAWINGS

Features, aspects, and advantages of the presently disclosed technology may be better understood with regard to the following description, appended claims, and accompanying drawings where:

Figure 1:
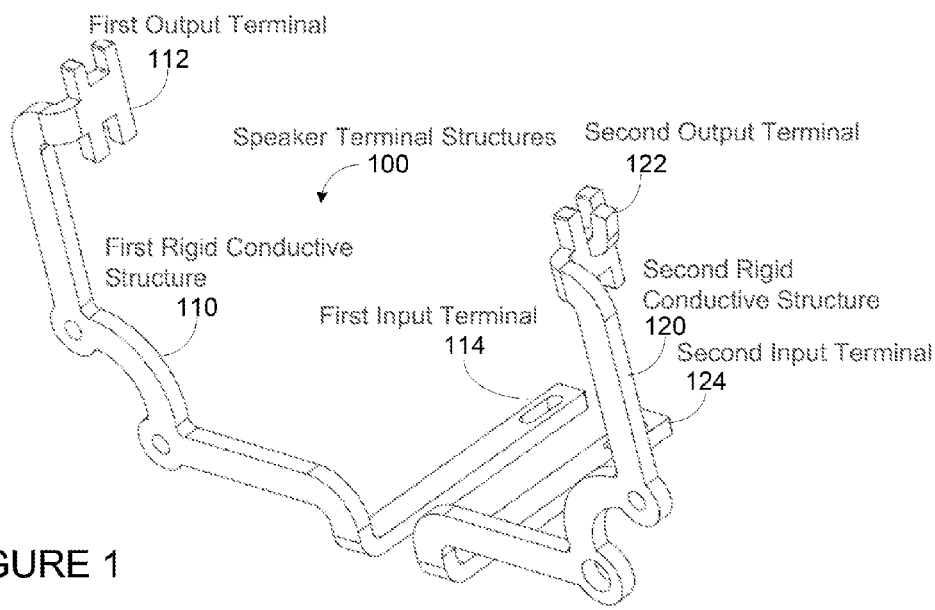
FIG. 1 shows an illustrative example pair of speaker terminal structures.

The drawings are for the purpose of illustrating example embodiments, but it is understood that the inventions are not limited to the arrangements and instrumentality shown in the drawings.

DETAILED DESCRIPTION

I. Overview

Examples described herein involve speaker terminals that help provide a reliable connection between a speaker voice coil and an audio source. The example speaker terminals further provide predictable characteristics of an electromagnetic field created when an audio signal is provided from the audio source to the voice coil. Accordingly, the electromagnetic field may be accounted for when designing a media playback device that includes such speaker terminals.

For instance, if the media playback device includes a network interface, the network interface may be positioned and/or designed to account for the predictable characteristics of the electromagnetic field. Likewise, if a position of the network interface is already determined, a position of the speaker terminals in the playback device may be determined based on the predictable characteristics of the electromagnetic field such that the electromagnetic field minimally disrupts an operation of the network interface. Further, positions of both the network device and the speaker terminals may be determined to account for the predictable characteristics of the electromagnetic field. Other examples are also possible.

In one example, an input of a speaker may include a pair of rigid conductive structures. A first of the pair of rigid conductive structures may include a first input terminal configured to couple to a first output of an audio source and a first output terminal configured to couple to a first input of a voice coil. The second of the pair of rigid conductive structures may include a second input terminal configured to couple to a second output of the audio source and a second output terminal configured to couple to a second input of the voice coil. The pair of rigid conductive structures may then be at least partially molded within a speaker basket.

A speaker may then be assembled using the speaker basket having molded within the pair of rigid conductive structures. The speaker assembly may further include a magnetic structure coupled to the speaker basket. A voice coil may be magnetically suspended about a central portion of the magnetic structure. As indicated above, the first output terminal of the first rigid conductive structure may be coupled to the first input of the voice coil. In one case, a conductive wire from the first input of the voice coil may be conductively coupled (i.e. soldered) to the first output terminal. Likewise, the second output terminal of the second rigid conductive structure may be coupled to the second input of the voice coil.

The speaker assembly may further include a speaker cone having an inner rim and an outer rim. The inner rim may be coupled to the voice coil, and the outer rim may be coupled to the speaker basket via a surround. A spider may further couple the voice coil to the speaker basket. An audio signal provided from the audio source to the first input terminal of the first rigid conductive structure and the second input terminal of the second rigid conductive structure may then cause a voice coil to move axially along the central portion of the magnetic structure. The movement of the voice coil may then create vibrations in the speaker cone, thereby producing sound.

In one example, the first and second input terminals of the first and second rigid conductive structures may be conductively coupled (i.e. soldered) directly to a printed circuit board (PCB) patterned to route audio signals from the audio source to the speaker assembly. Such a direct conductive coupling between the terminals of the speaker assembly and the PCB may help offer a robust and reliable connection between the speaker and the audio source.

When an audio signal is passed through the first and second rigid conductive structures, an electromagnetic field is created around the first and second input terminals. In this case, a rigidity of the first and second rigid conductive structure, and in particular a rigidity of the first and second input terminals of the first and second rigid conductive structures allows the characteristics of the created electromagnetic field to be substantially consistent and therefore predictable. In the case that the speaker assembly is a part of a media playback device, design of the media playback device and other components in the media playback device may accordingly take into account the predictable characteristics of the electromagnetic field. For instance, as indicated above, a position and/or design of a network interface of the media playback device may be determined at least partially based on the predictable characteristics of the electromagnetic field.

In one example, the media playback system may include an array of two or more speaker assemblies. In such a case, the input terminals of the two or more speaker assemblies may be conductively coupled to the same PCB. Such a configuration may allow more efficient, consistent, and reliable assembly of a media playback device.

As indicated above, examples described herein involve rigid speaker terminals that provide a reliable connection between a speaker voice coil and an audio source, as well as predictable characteristics of an electromagnetic field created when an audio signal is provided from the audio source to the voice coil.

In one aspect, an apparatus is provided. The apparatus includes a first rigid conductive structure that has (i) a first input terminal configured to couple to a first output of an audio source and (ii) a first output terminal configured to couple to a first input of a voice coil, and a second rigid conductive structure that has (i) a second input terminal configured to couple to a second output of the audio source and (ii) a second output terminal configured to couple to a second input of the voice coil. The apparatus further includes a speaker basket molded about at least a portion the first rigid conductive structure and at least a portion of the second rigid conductive structure.

In another aspect, a method is provided. The method involves forming a first rigid conductive structure having (i) a first input terminal configured to couple to a first output of an audio source and (ii) a first output terminal configured to couple to a first input of a voice coil, forming a second rigid conductive structure having (i) a second input terminal configured to couple to a second output of the audio source and (ii) a second output terminal configured to couple to a second input of the voice coil, and molding a speaker basket structure about at least a portion of the rigid conductive structure.

In a further aspect, a speaker array is provided. The speaker array includes a printed circuit board (PCB), and a first speaker assembly. The first speaker assembly includes a first voice coil, a first rigid conductive structure having (i) a first input terminal rigidly coupled to a first output of the PCB and (ii) a first output terminal coupled to a first input of the first voice coil, a second rigid conductive structure having (i) a second input terminal rigidly coupled to a second output of the PCB and (ii) a second output terminal coupled to a second input of the first voice coil, and a first speaker basket molded about at least a portion the first rigid conductive structure and at least a portion of the second rigid conductive structure.

While discussions of examples herein may generally be directed to a speaker terminal, one of ordinary skill in the art will appreciate that the examples and variations of the examples can also be implemented and/or utilized for other purposes as well.

II. Example Speaker Terminals for a Speaker Assembly

As indicated above, examples described herein involve speaker terminals that provide a reliable connection between a speaker voice coil and an audio source. Included in the following sections are discussions relating to example speaker terminals, example methods for manufacturing the example speaker terminals, and example speaker assemblies that include the example speaker terminals, among other discussions.

a. Example Speaker Terminals

FIG. 1 shows an illustrative example pair of speaker terminal structures 100. As shown, the pair of speaker terminal structures 100 includes a first rigid conductive structure 110 and a second rigid conductive structure 120.

The first rigid conductive structure 110 may have a first input terminal 114, and a first output terminal 112. The first input terminal 114 may be configured to couple to a first output of an audio source. In one example, the first input terminal 114 may be conductively coupled to a printed circuit board (PCB) patterned to route the first input terminal 114 to the first output of the audio source. In one case, a structure of the first input terminal 114 may be designed to be conducive to such a conductive coupling to the PCB. For instance, as shown, the first input terminal 114 may have a flat surface for contacting a conductive portion of the PCB at which the first input terminal 114 may be conductively coupled to the PCB. An example of such a PCB is shown in and discussed below in connection to FIG. 6.

The first output terminal 112 may be configured to couple to a first input of a voice coil. In one example, the first output terminal 112 may be conductively coupled to the voice coil via a first wire lead from the voice coil. For instance, the first wire lead may be soldered to the first output terminal 112. In one case, a structure of the first output terminal 112 may be designed to be conducive to such a conductive coupling to the first wire lead from the voice coil. For instance, as shown, the first output terminal 112 may have one or more hook-like structures around which the first wire lead can be wrapped. The wrapping of the first wire lead around the one or more hook-like structure may reduce any stress on a solder join between the first wire lead and the first output terminal 112 during handling (i.e. manufacturing/assembly) or operation of a speaker assembly that includes the first rigid conductive structure.

As shown, the second rigid conductive structure 120 may have a second input terminal 124, and a first output terminal 122. The second input terminal 124 may be configured to couple to a second output of the audio source. In one example, the second input terminal 124 may be conductively coupled to the PCB, which may be patterned to also route the second input terminal 124 to the second output of the audio source. In one case, the structure of the second input terminal 124 may be similar to the structure of the first input terminal 114. For instance, the structure of the second input terminal 124 may also have a flat surface for contacting a conductive portion of the PCB at which the first input terminal 124 may be conductively coupled to the PCB. In another case, the structure of the second input terminal 124 may be different from the structure of the first input terminal 114. Other examples are also possible.

The second output terminal 122 may be configured to couple to a second input of the voice coil. In one example, the second output terminal 122 may be conductively coupled to the voice coil via a second wire lead from the voice coil. In one case, a structure of the second output terminal 122 may be similar to the structure of the first output terminal 112. For instance, the second output terminal 122 may also have one or more hook-like structures around which the second wire lead can be wrapped. In another case, the structure of the second output terminal 122 may be different from the structure of the first output terminal 112. Other examples are also possible.

In one example, the first rigid conductive structure 110 and the second rigid conductive structure 120 may make up a signal path for a differential signal, such as a differential audio signal. As such, the first input terminal 114 and the second input terminal 124 may make up a differential input terminal of the speaker terminal structures 100, while the first output terminal 112 and the second output terminal 122 may make up a differential output terminal of the speaker terminal structures 100.

In one case, the first input of the voice coil and the second input of the voice coil may make up a differential input of the voice coil. Accordingly, the differential output terminal of the speaker terminal structures 100 may be coupled to the differential input terminal of the voice coil via the first and second wire leads.

Figure 2:
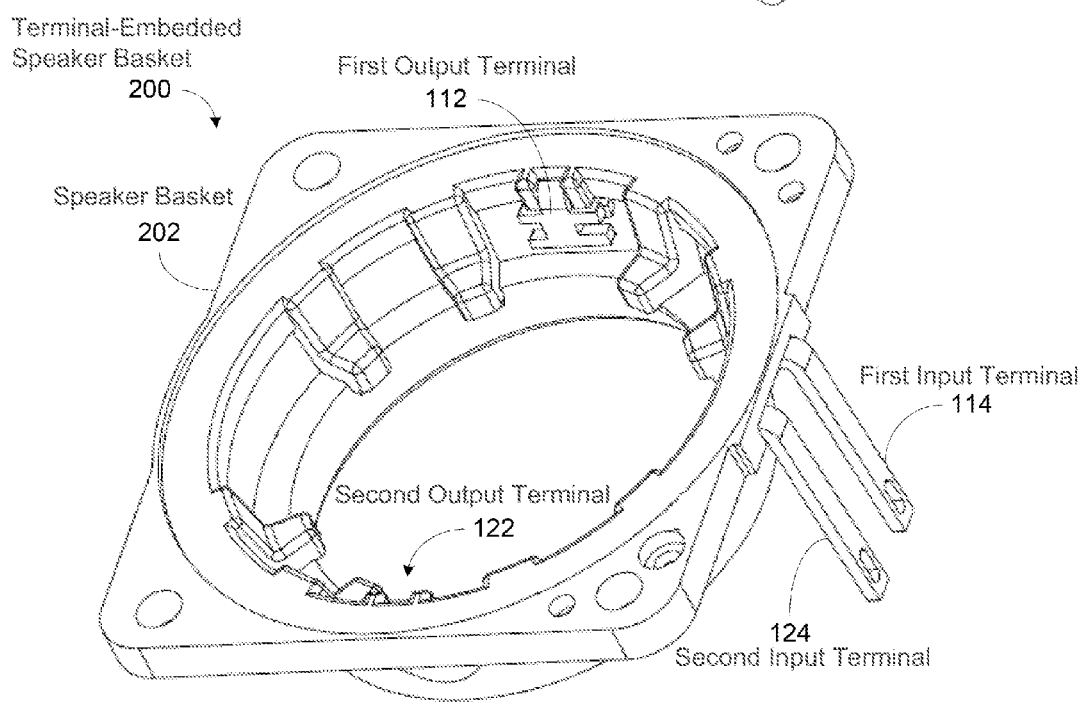
FIG. 2 shows an illustrative example of a terminal-embedded speaker basket.

In one example, at least a portion of the first rigid conductive structure 110 and at least a portion of the second rigid conductive structure 120 may be molded within a speaker basket structure. FIG. 2 shows an illustrative example of a terminal-embedded speaker basket 200. The terminal-embedded speaker basket 200 includes a speaker basket 202 which has molded within at least the portion of the first rigid conductive structure 110 and at least the portion of the second rigid conductive structure 120. As shown, the first input terminal 114 of the first rigid conductive structure 110 and the second input terminal 124 of the second rigid conductive structure 120 may be outside of (and not molded within) the speaker basket 202, and extends out from a side of the speaker basket 202.

Further, the first output terminal 112 (as also shown in FIG. 2) and the second output terminal 122 (obscured by the speaker basket 202 and therefore not shown in FIG. 2) may also be not molded within the speaker basket 202, and is exposed along respective inner sections of the speaker basket 202.

In one example, as shown in FIGS. 1 and 2, the first input terminal 114 may be parallel to the second input terminal 124. In another example, the first input terminal 114 may be orthogonal to the second input terminal 124. As indicated above, an electromagnetic field may be created about the first input terminal 114 and the second input terminal 124 when an audio signal is provided to the first input terminal 114 and the second input terminal 124. Characteristics of the created electromagnetic field may depend on an orientation of the first input terminal 114 relative to the second input terminal 124. In other words, given substantially the same audio signal, the created electromagnetic field may differ between the case the first input terminal 114 is parallel to the second input terminal 124, and the case the first input terminal 114 is orthogonal to the second input terminal 124. Nevertheless, given the rigid structure of the first input terminal 114 and the second input terminal 124, the characteristics of the created electromagnetic field may be consistent, and therefore predictable for a range of audio signal magnitudes and frequencies that are provided through the first input terminal 114 and second input terminal 124.

b. Example Methods for Manufacturing Speaker Terminals

Figure 3:
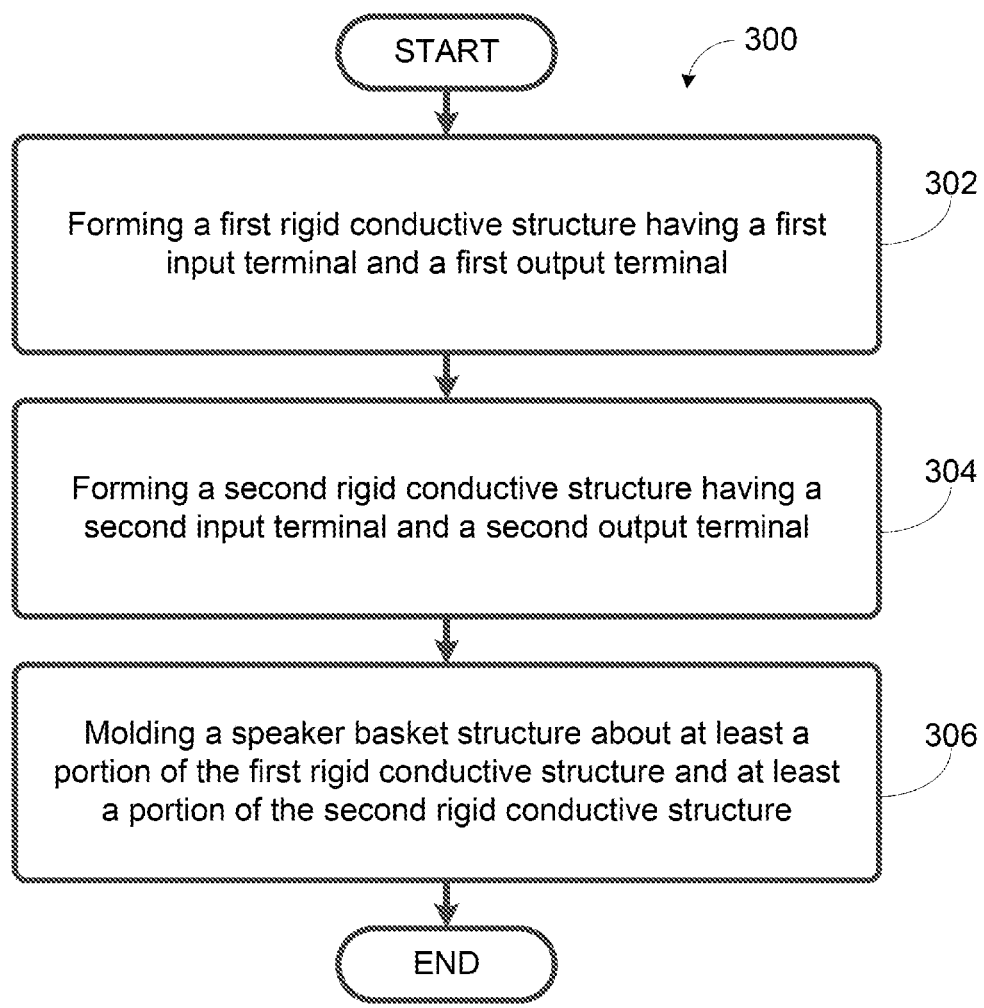
FIG. 3 shows an example method for manufacturing speaker terminals and a speaker basket.

FIG. 3 shows an example method 300 for manufacturing speaker terminals and a speaker basket, such as those shown in and described in connection to FIGS. 1 and 2. Method 300 includes one or more operations, functions, or actions as illustrated by one or more of blocks 302-306. Although the blocks are illustrated in sequential order, these blocks may also be performed in parallel, and/or in a different order than those described herein. Also, the various blocks may be combined into fewer blocks, divided into additional blocks, and/or removed based upon the desired implementation. In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, each block in FIG. 3 may represent circuitry that is wired to perform the specific logical functions in the process.

As shown in FIG. 3, the method 300 involves forming a first rigid conductive structure having a first input terminal and a first output terminal at block 302, forming a second rigid conductive structure having a second input terminal and a second output terminal at block 304, and molding a speaker basket structure about at least a portion of the first rigid conductive structure and at least a portion of the second rigid conductive structure at block 306.

At block 302, the method 300 involves forming a first rigid conductive structure having a first input terminal and a first output terminal. The first rigid conductive structure of block 302 may be the first rigid conductive structure 110 of FIGS. 1 and 2. As such, the first input terminal may be the first input terminal 114, and the first output terminal may be the first output terminal 112.

In one example, the first rigid conductive structure 110 may be formed by stamping the first rigid conductive structure 110 out of conductive material. In another example, the first rigid conductive structure 110 may be formed by machining the first rigid conductive structure 110 from conductive material. In yet another example, the first rigid conductive material 110 may be formed by molding the conductive structure from conductive material. In the above examples, the conductive material may be one or more of a copper, aluminum, silver, and gold alloy, among other possibilities. Other examples are also possible.

At block 304, the method 300 involves forming a second rigid conductive structure having a second input terminal and a second output terminal. The second rigid conductive structure of block 304 may be the second rigid conductive structure 120 of FIGS. 1 and 2. As such, the second input terminal may be the second input terminal 124, and the second output terminal may be the second output terminal 122.

Forming of the second rigid conductive structure 120 may be similar to the formation of the first rigid conductive structure 110 described in connection to block 302. As such, any discussion relating to the formation of the first rigid conductive structure 110 may also be applied to the formation of the second rigid conductive structure 120. Other examples are also possible.

At block 306, the method 300 involves molding a speaker basket structure about at least a portion of the first rigid conductive structure and at least a portion of the second rigid conductive structure. Referring again to FIGS. 1 and 2, the first rigid conductive structure may be the first rigid conductive structure 110, the second rigid conductive structure may be the second rigid conductive structure 120, and the speaker basket may be the speaker basket 202.

In one example, molding of the speaker basket 202 about at least the portion of the first rigid conductive structure 110 and at least the portion of the second rigid conductive structure 120 may involve positioning the first rigid conductive structure 100 and the second rigid conductive structure on a frame (or matrix), such that at least the portion of the first rigid conductive structure 100 and at least the portion of the second rigid conductive structure 120 is within a molding cavity of the frame. As indicated previously, the first input terminal 114, first output terminal 112, second input terminal 124, and second output terminal 122 may be outside the molding cavity when the first rigid conductive structure 100 and the second rigid conductive structure is positioned on the frame.

Upon positioning the first rigid conductive structure 100 and the second rigid conductive structure 120 on the frame as described, the speaker basket 202 may be molded within the molding cavity of the frame. Molding of the speaker basket 202 may be performed using a compression molding process, a transfer molding process, or an injection molding process, among other possibilities. In one example, the speaker basket 202 may include a plastic material.

In some cases, multiple molding iterations may be performed to produce the speaker basket 202. For instance, the speaker basket 202 may include multiple types of plastic material for different structural properties at different parts of the speaker basket 202. In such a case, each of the molding iteration may be performed to mold a different plastic material to form a different part of the speaker basket 202. The different molding iterations may be performed using one or more molding processes, including those listed above. Other examples are also possible.

Upon molding the speaker basket 202 about at least the portion of the first rigid conductive structure 110 and at least the portion of the second rigid conductive structure 120, the terminal-embedded speaker basket 200 as shown in FIG. 2 may be provided. As will be discussed in the following sections, the terminal-embedded speaker basket 200 may then be used in a speaker assembly.

c. Example Speaker Assembly

Figure 4:
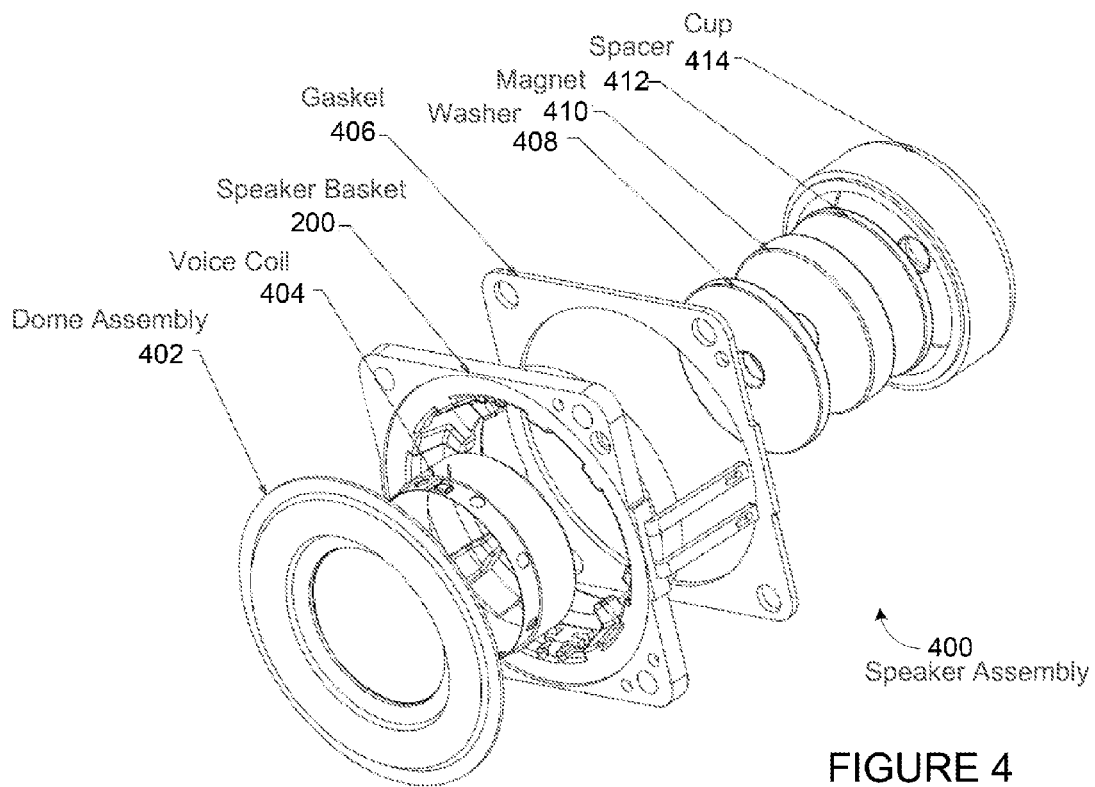
FIG. 4 shows an illustrative example of components of a speaker assembly.
Figure 5:
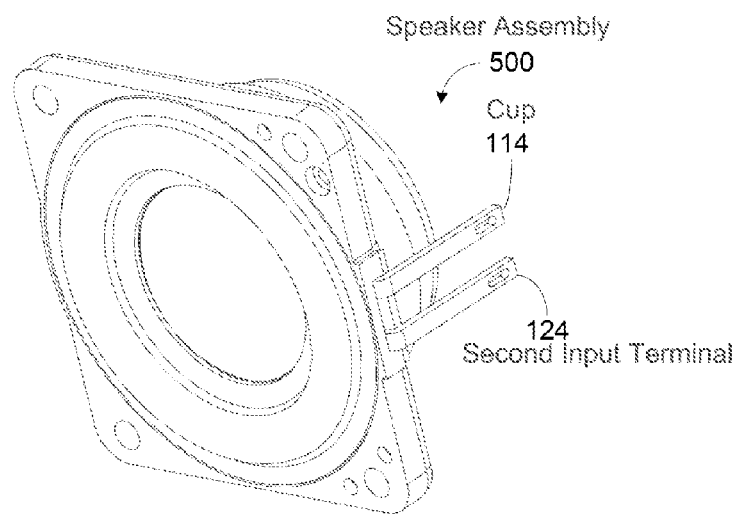
FIG. 5 shows an illustrative example of a speaker assembly.

FIG. 4 shows an illustrative example of components 400 of a speaker assembly, and FIG. 5 shows an illustrative example of a speaker assembly 500 including the components 400. The components 400 include a dome assembly 402, a voice coil 404, the terminal-embedded speaker basket 200, a gasket 406, a washer 408, a magnet 410, a spacer 412, and a cup 414. The gasket 406 may be provided to as an interface for mounting the speaker assembly 500. The dome assembly 402 may include a speaker cone and a surround coupled to an outer rim of the speaker cone. In some cases, the dome assembly 402 may also include a dust cap covering a central opening of the speaker cone. The washer 408, magnet 410, spacer 412, and cup 414 make up a magnetic structure, and the washer 408 and magnet 410 may make up a central portion of the magnetic structure.

As discussed above, the terminal-embedded speaker basket 200 may have the first input terminal 114 of the first rigid conductive structure 110 and the second input terminal 124 of the second rigid conductive structure 120 extending out from a side of the speaker basket 202. Likewise, terminal-embedded speaker basket 200 may have the first output terminal 112 and the second output terminal 122 exposed along respective inner sections of the speaker basket 202.

The first output terminal 112 of the first rigid conductive structure 110 may be conductively coupled to a first input of the voice coil 404, and the second output terminal 122 of the second rigid conductive structure 120 may be conductively coupled to a second input of the voice coil 404. As described above, a first wire lead from the first input of the voice coil 404 may be soldered to the first output terminal 112 and a second wire lead from the second input of the voice coil 404 may be soldered to the second output terminal 122.

The magnetic structure may be coupled to the terminal-embedded speaker basket 200. In one case, the magnetic structure may be coupled to the terminal-embedded speaker basket 200 via the cup 414. The voice coil 404 may be magnetically suspended about the central portion of the magnetic structure. An inner rim of the speaker cone (which may define the central opening of the speaker cone) may be coupled to the voice coil, and the dome assembly 402 may be coupled to the terminal-embedded speaker basket 200 via the surround of the dome assembly 402. In some cases, the components 400 of the speaker assembly 500 may also include a speaker spider structurally coupling the voice coil 404 to the speaker basket 202. The speaker spider may be provided to help maintain a concentric position of the voice coil 404 relative to the magnetic structure.

In one example, a differential audio signal provided from the first and second outputs of the audio source to the voice coil via the first rigid conductive structure 110 and second rigid conductive structure 120 may drive the voice coil and cause the voice coil to move axially along the central portion of the magnetic structure. The axial movement of the voice coil may create vibrations in the speaker cone, thereby producing sound.

As shown in FIG. 5, the first input terminal 114 and the second input terminal 124 may extend out from the speaker assembly 500. As discussed previously, the first input terminal 114 and the second input terminal 124 may be coupled to the first output of the audio source and the second output of the audio source, respectively, via a PCB. For instance, the first input terminal 114 and the second input terminal 124 may each be soldered to the PCB and conductively routed to the first output and second output, respectively, of the audio source. In some cases, the PCB may be conductively coupled to the audio source via additional wires and/or PCB's. Other examples are also possible.

In some cases, an air-tightness of a speaker cavity in a media playback device may affect an audio quality of the media playback device. As such, in one example, a speaker basket such as the terminal-embedded speaker basket 200 may be molded such that the speaker assembly 500 as shown in FIG. 5 is effectively air-tight, thereby ensuring a consistent audio quality of the media playback device. Other examples are also possible.

III. Example Speaker Array

In one example, a media playback device, such as one that is discussed in the following section, may include an array of two or more speaker assemblies. In such a case, the input terminals of the two or more speaker assemblies may be conductively coupled to the same PCB. As indicated previously, such a configuration may allow more efficient, consistent, and reliable assembly of a media playback device.

Figures 6, 7:
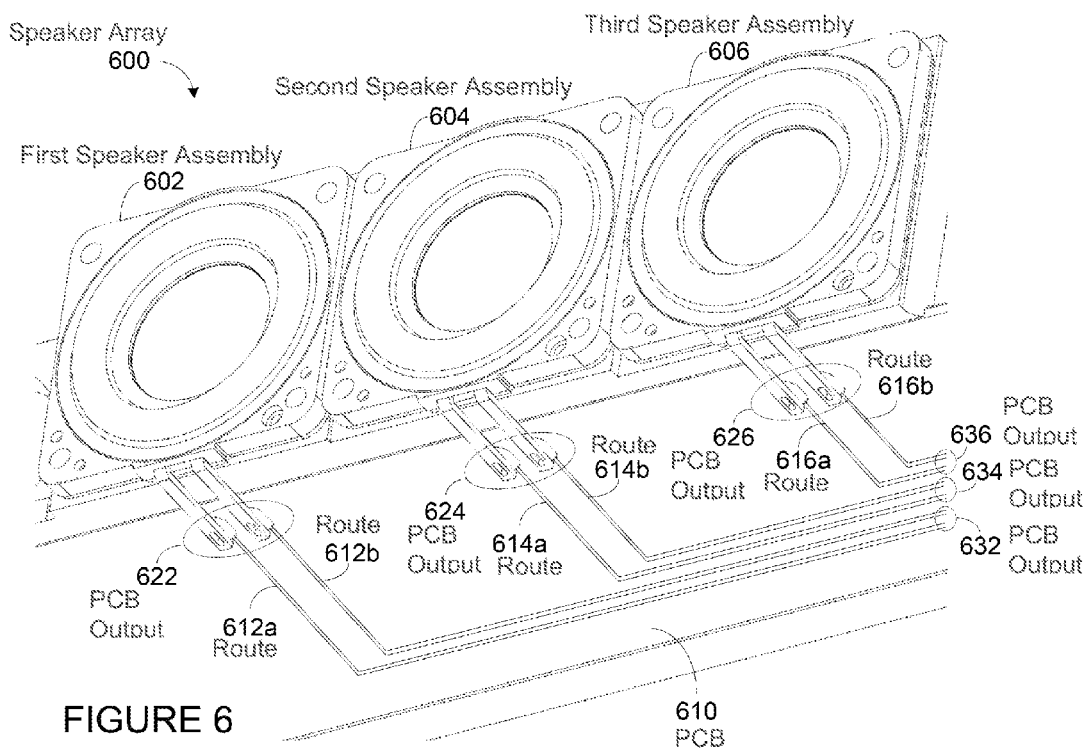
FIG. 6 shows an illustrative example of a speaker array.
FIG. 7 shows a functional block diagram of a media playback device.

FIG. 6 shows an illustrative example of a speaker array 600. The speaker array 600 includes a first speaker assembly 602, a second speaker assembly 604, and a third speaker assembly 606. The speaker array 600 further includes a PCB 610 having PCB outputs 622, 624, and 626, and PCB inputs 632, 634, and 636. The PCB 610 also includes conductive routes 612a and 612b coupling the PCB output 622 to the PCB input 632, conductive routes 614a and 614b coupling the PCB output 632 to the PCB 634, and conductive routes 616a and 616b coupling the PCB output 636 to the PCB input 626. One having ordinary skill in the art will appreciate that the speaker array 600 is just one illustrative example of a speaker array. For instance, the speaker array 600 may include fewer or more speaker assemblies. Other examples are also possible.

Each of the speaker assemblies 602, 604, and 606 may be a speaker assembly similar to the speaker assembly 500 shown in and discussed above in connection to FIG. 5. In other words, each of the speaker assemblies 602, 604, and 606 may include components such as the components 404 shown in and discussed above in connection to FIG. 4, and assembled as described above in connection to FIGS. 4 and 5. While the speaker assemblies 602, 604, and 606 shown in FIG. 6 appear to be substantially the same, one having ordinary skill in the art will appreciate that the speaker assemblies 602, 604, and 606 may be different speaker assemblies. For instance, speaker assembly 602 may be a smaller speaker assembly configured to play high frequency audio content, while speaker assembly 606 may be a larger speaker assemble configured to play low frequency audio content. Other examples are also possible.

The first speaker assembly 602 may be coupled to the PCB 610 via a conductive coupling between the PCB output 622 and input terminals of the first speaker assembly 602. Similarly, the second speaker assembly 604 may be coupled to the PCB 610 via a conductive coupling between the PCB output 624 and input terminals of the second speaker assembly 604, and the third speaker assembly 606 may be coupled to the PCB 610 via a conductive coupling between the PCB output 626 and input terminals of the third speaker assembly 606.

The PCB inputs 632, 634, and 636 may each be coupled to the audio source either directly, or via additional wires and/or PCB's. The audio source may provide to PCB input 632, via a first audio source output, a first audio signal to be played by the first speaker assembly 602. Similarly, the audio source may provide to PCB input 634, via a second audio source output, a second audio signal to be played by the second speaker assembly 604, and provide to PCB input 636, via a third audio source output, a third audio signal to be played by the third speaker assembly 606. As indicated above, each of the first, second, and third audio signals may be differential audio signals.

In one case, each of the first, second, and third audio signals may be the same audio signal. In another case, each of the first, second, and third audio signals may be different audio signals. For instance, the first audio signal may include primarily high frequency audio content to be played by the first speaker assembly 602, while the third audio signal may include primarily low frequency audio content to be played by the third speaker assembly 603. Other examples are also possible.

As discussed previously, when an audio signals are passed through the conductive routs 612a, 612b, 614a, 614b, 616a, and 616b, and the input terminals of the speaker assemblies 602, 604, and 606, electromagnetic fields may be created around the input terminals and the conductive routes. In the examples discussed herein, however, the characteristics of the created electromagnetic fields may be substantially predictable due to the rigid and consistent positioning of the input terminals and conductive routes when the speaker array 600 is implemented within a media playback device.

As such, design of the media playback device and other components in the media playback device may take into account the predictable characteristics of the created electromagnetic field. In one example, if the media playback device has a wireless communication interface that includes an antenna, a configuration of the antenna may be determined based the predictable characteristics of the created electromagnetic field. Referring back to FIGS. 1, 2, 4, and 5, the configuration of the antenna may be determined based on at least an orientation of the first input terminal 114 of the first rigid conductive structure 110 and an orientation of the second input terminal 124 of the second rigid conductive structure 122.

In another example, the antenna and/or other circuitry of the wireless communication interface may be positioned a predetermined distance away from the first input terminal 114 and the second input terminal 124. The predetermined distance may be determined as a disruptive range of the created electromagnetic field during regular media playback by the media playback device. For instance, if the wireless communication interface operates reliably under a certain amount of interference, the predetermined distance may be determined as a distance from the first input terminal 114 and the second input terminal 124 at which the created electromagnetic field causes less than the certain amount of interference. The wireless communication interface may then be positioned at least the predetermined distance away from the first input terminal 114 and the second input terminal 124.

In further example, both a position of one or more speaker assemblies (and accordingly, a position of the one or more respective differential input terminals of the speaker assemblies) in the media playback device and a position of the wireless communication interface may be determined together according to the predictable characteristics of the electromagnetic field and the predetermined distance. Other examples are also possible.

One having ordinary skill in the art will appreciate that the component design and positioning considerations described above may also be applied to components in the media playback device, other than the wireless communication interface. In other words, a position of any component in the media playback system of which operations may be disrupted by the electromagnetic field may be determined at least partially based on the predictable characteristics of the electromagnetic field.

IV. Example Media Playback Device

FIG. 7 shows a functional block diagram of a media playback device 700 within which one or more speaker assemblies and/or speaker arrays as discussed in the previous sections may be implemented. The media playback device 700 may include a processor 702, software components 704, memory 706, audio processing components 708, audio amplifier(s) 710, speaker(s) 712, and a network interface 714 including wireless interface(s) 716 and wired interface(s) 718. The speaker(s) 712 may include one or more of the speaker assemblies and/or speaker arrays discussed in the previous sections. As indicated above, one or more of the components of the media playback device 700 may be designed and/or implemented to account for any predictable electromagnetic fields created when an audio signal is provided to the speaker(s) 712. For instance, an antenna of the wireless interface(s) 716 may be configured based on the predictable electromagnetic fields.

In one example, the processor 702 may be a clock-driven computing component configured to process input data according to instructions stored in the memory 706. The memory 706 may be a tangible computer-readable medium configured to store instructions executable by the processor 702. For instance, the memory 706 may be data storage that can be loaded with one or more of the software components 704 executable by the processor 702 to achieve certain functions. In one example, the functions may involve the media playback device 700 retrieving audio data from an audio source or another media playback device. In another example, the functions may involve the media playback device 700 sending audio data to another device or media playback device on a network. In yet another example, the functions may involve pairing of the media playback device 700 with one or more media playback devices to create a multi-channel audio environment.

Certain functions may involve the media playback device 700 synchronizing playback of audio content with one or more other media playback devices. During synchronous playback, a listener will preferably not be able to perceive time-delay differences between playback of the audio content by the media playback device 700 and the one or more other media playback devices. U.S. Pat. No. 8,234,395 entitled, "System and method for synchronizing operations among a plurality of independently clocked digital data processing devices," which is hereby incorporated by reference, provides in more detail some examples for audio playback synchronization among media playback devices.

The memory 706 may further be configured to store data associated with the media playback device 700, such as one or more zones and/or zone groups the media playback device 700 may be a part of, audio sources accessible by the media playback device 700, or a playback queue that the media playback device 700 (or some other media playback device) may be associated with. The data may be stored as one or more state variables that are periodically updated and used to describe the state of the media playback device 700. The memory 706 may also include the data associated with the state of the other devices of the media system, and shared from time to time among the devices so that one or more of the devices have the most recent data associated with the system. Other embodiments are also possible.

The audio processing components 708 may include one or more digital-to-analog converters (DAC), an audio preprocessing component, an audio enhancement component or a digital signal processor (DSP), and so on. In one embodiment, one or more of the audio processing components 708 may be a subcomponent of the processor 702. In one example, audio content may be processed and/or intentionally altered by the audio processing components 708 to produce audio signals. The produced audio signals may then be provided to the audio amplifier(s) 710 for amplification and playback through speaker(s) 712. Particularly, the audio amplifier(s) 710 may include devices configured to amplify audio signals to a level for driving one or more of the speakers 712. The speaker(s) 712 may include an individual speaker (e.g., a "driver") or a complete speaker system involving an enclosure with one or more drivers. A particular driver of the speaker(s) 712 may include, for example, a subwoofer (e.g., for low frequencies), a mid-range driver (e.g., for middle frequencies), and/or a tweeter (e.g., for high frequencies). In some cases, each speaker in the one or more speakers 712 may be driven by an individual corresponding audio amplifier of the audio amplifier(s) 710. In addition to producing analog signals for playback by the media playback device 700, the audio processing components 708 may be configured to process audio content to be sent to one or more other media playback devices for playback.

Audio content to be processed and/or played back by the media playback device 700 may be received from an external source, such as via an audio line-in input connection (e.g., an auto-detecting 3.5 mm audio line-in connection) or the network interface 714.

The network interface 714 may be configured to facilitate a data flow between the media playback device 700 and one or more other devices on a data network. As such, the media playback device 700 may be configured to receive audio content over the data network from one or more other media playback devices in communication with the media playback device 700, network devices within a local area network, or audio content sources over a wide area network such as the Internet. In one example, the audio content and other signals transmitted and received by the media playback device 700 may be transmitted in the form of digital packet data containing an Internet Protocol (IP)-based source address and IP-based destination addresses. In such a case, the network interface 714 may be configured to parse the digital packet data such that the data destined for the media playback device 700 is properly received and processed by the media playback device 700.

As shown, the network interface 714 may include wireless interface(s) 716 and wired interface(s) 718. The wireless interface(s) 716 may provide network interface functions for the media playback device 700 to wirelessly communicate with other devices (e.g., other media playback device(s), speaker(s), receiver(s), network device(s), control device(s) within a data network the media playback device 700 is associated with) in accordance with a communication protocol (e.g., any wireless standard including IEEE 802.11a, 802.11b, 802.11g, 802.11n, 802.11 ac, 802.15, 4G mobile communication standard, and so on). The wired interface(s) 718 may provide network interface functions for the media playback device 700 to communicate over a wired connection with other devices in accordance with a communication protocol (e.g., IEEE 802.3). While the network interface 714 shown in FIG. 7 includes both wireless interface(s) 716 and wired interface(s) 718, the network interface 714 may in some embodiments include only wireless interface(s) or only wired interface(s). As indicated above, some components of the wireless interface(s) 716, such as an antenna may be designed based on any predictable electromagnetic fields created when an audio signal is provided to the speaker(s) 712.

In one example, the media playback device 700 and one other media playback device may be paired to play two separate audio components of audio content. For instance, media playback device 700 may be configured to play a left channel audio component, while the other media playback device may be configured to play a right channel audio component, thereby producing or enhancing a stereo effect of the audio content. The paired media playback devices (also referred to as "bonded media playback devices") may further play audio content in synchrony with other media playback devices.

In another example, the media playback device 700 may be sonically consolidated with one or more other media playback devices to form a single, consolidated media playback device. A consolidated media playback device may be configured to process and reproduce sound differently than an unconsolidated media playback device or media playback devices that are paired, because a consolidated media playback device may have additional speaker drivers through which audio content may be rendered. For instance, if the media playback device 700 is a media playback device designed to render low frequency range audio content (i.e. a subwoofer), the media playback device 700 may be consolidated with a media playback device designed to render full frequency range audio content. In such a case, the full frequency range media playback device, when consolidated with the low frequency media playback device 700, may be configured to render only the mid and high frequency components of audio content, while the low frequency range media playback device 700 renders the low frequency component of the audio content. The consolidated media playback device may further be paired with a single media playback device or yet another consolidated media playback device.

By way of illustration, SONOS, Inc. presently offers (or has offered) for sale certain media playback devices including a "PLAY:1," "PLAY:3," "PLAY:5," "PLAYBAR," "CONNECT:AMP," "CONNECT," and "SUB." Any other past, present, and/or future media playback devices may additionally or alternatively be used to implement the media playback devices of example embodiments disclosed herein. Additionally, it is understood that a media playback device is not limited to the example illustrated in FIG. 7 or to the SONOS product offerings. For example, a media playback device may include a wired or wireless headphone. In another example, a media playback device may include or interact with a docking station for personal mobile playback devices. In yet another example, a media playback device may be integral to another device or component such as a television, a lighting fixture, or some other device for indoor or outdoor use. Other examples are also possible.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. An apparatus comprising:
   a speaker basket for mounting of a speaker assembly through an opening in the speaker basket, the speaker assembly comprising a voice coil;
   a first rigid conductive structure comprising (i) a first input terminal configured to couple to a first output of an audio source, (ii) a first output terminal configured to couple to a first input of the voice coil, and (iii) a first connection element that electrically connects the first input terminal to the first output terminal, the first connection element molded into the speaker basket around at least a first portion of the opening in the speaker basket; and
   a second rigid conductive structure comprising (i) a second input terminal configured to couple to a second output of the audio source, (ii) a second output terminal configured to couple to a second input of the voice coil, and (iii) a second connection element that electrically connects the second input terminal to the second output terminal, the second connection element molded into the speaker basket around at least a second portion of the opening in the speaker basket.

2. The apparatus of claim 1, wherein the first input terminal of the first rigid conductive structure is parallel to the second input terminal of the second rigid conductive structure.

3. The apparatus of claim 1, wherein the first input terminal of the first rigid conductive structure is orthogonal to the second input terminal of the second rigid conductive structure.

4. The apparatus of claim 1,
   wherein the first output terminal protrudes from the speaker basket for coupling to the first input of the voice coil and wherein the second output terminal protrudes from the speaker basket for coupling to the second input of the voice coil.

5. The apparatus of claim 1, wherein the speaker assembly further comprises:
   a magnetic structure coupled to the speaker basket, wherein the voice coil is magnetically suspended about a central portion of the magnetic structure.

6. The apparatus of claim 5, wherein the speaker assembly further comprises:
   a speaker cone having an inner rim and an outer rim, wherein the inner rim is coupled to the voice coil and the outer rim is coupled to the speaker basket via a surround; and
   a spider coupling the voice coil to the speaker basket.

7. The apparatus of claim 5, wherein the voice coil is configured to move axially along the central portion of the magnetic structure in response to a differential audio signal provided via the first output of the audio source and the second output of the audio source.

8. A method comprising:
   forming a first rigid conductive structure comprising (i) a first input terminal configured to couple to a first output of an audio source, (ii) a first output terminal configured to couple to a first input of a voice coil, and (iii)

a first connection element that electrically connects the first input terminal to the first output terminal;

forming a second rigid conductive structure comprising (i) a second input terminal configured to couple to a second output of the audio source, (ii) a second output terminal configured to couple to a second input of the voice coil, and (iii) a second connection element that electrically connects the second input terminal to the second output terminal; and molding a speaker basket about the first connection element to position the first connection element around at least a first portion of an opening in the speaker basket and (ii) the second connection element to position the second connection element around at least a first portion of the opening in the speaker basket, wherein a speaker assembly is mountable through the opening in the speaker basket.

9. The method of claim 8, wherein the first output terminal protrudes from the speaker basket for coupling to the first input of the voice coil and wherein the second output terminal protrudes from the speaker basket for coupling to the second input of the voice coil.

10. The method of claim 8, wherein forming a first rigid conductive structure comprises one or more of: (a) stamping the fist rigid conductive structure out of conductive material, (b) machining the first rigid conductive structure from conductive material, and (c) molding the first rigid conductive structure from conductive material.

11. The method of claim 8,
wherein traces of a rigid printed circuit board (PCB) route the audio source to respective solder terminals of the rigid PCB, and wherein the first input terminal of the first rigid conductive structure is soldered to solder terminals to connect the first output of the audio source to the first input terminal.

12. The method of claim 8, further comprising:
constructing a speaker assembly within the speaker basket, the speaker assembly comprising:
the voice coil; and
a magnetic structure coupled to the speaker basket, wherein the voice coil is magnetically suspended about a central portion of the magnetic structure.

13. The method of claim 12, wherein the speaker assembly further comprises:
a speaker cone having an inner rim and an outer rim, wherein the inner rim coupled to the voice coil and the outer rim coupled to the speaker basket via a surround; and
a spider coupling the voice coil to the speaker basket.

14. The method of claim 8, wherein the speaker assembly is a component of a media playback device, and wherein the method further comprises:
determining a configuration of an antenna of the media playback device based on an orientation of the first input terminal of the first rigid conductive structure and an orientation of the second input terminal of the second rigid conductive structure.

15. A speaker array comprising:
a printed circuit board (PCB) comprising traces routed to couple to an audio source to a first output of the PCB and second output of the PCB; and
a speaker basket for mounting of a first speaker assembly through an opening in the speaker basket;
the first speaker assembly comprising:
a first voice coil;
a first rigid conductive structure comprising (i) a first input terminal rigidly coupled to a first output of the PCB, (ii) a first output terminal configured to couple to a first input of the first voice coil, and (iii) a first connection element that electrically connects the first input terminal to the first output terminal, the first connection element molded into the speaker basket around at least a first portion of the opening in the speaker basket; and
a second rigid conductive structure comprising (i) a second input terminal rigidly coupled to a second output of the PCB, (ii) a second output terminal configured to couple to a second input of the first voice coil, and (iii) a second connection element that electrically connects the second input terminal to the second output terminal, the second connection element molded into the speaker basket around at least a second portion of the opening in the speaker basket.

16. The speaker array of claim 15, wherein the traces of the PCB further comprise:
a first signal route comprising the first output of the PCB and a first input of the PCB, wherein the first input of the PCB is configured to be coupled to a first output of the audio source; and
a second signal route comprising the second output of the PCB and a second input of the PCB, wherein the second input of the PCB is configured to be coupled to a second output of the audio source, wherein the first signal route and the second signal route are configured to transmit a differential audio signal from the audio source to the first speaker assembly.

17. The speaker array of claim 15, wherein the first speaker assembly further comprises:
a magnetic structure coupled to the speaker basket, wherein the first voice coil is magnetically suspended about a central portion of the magnetic structure.

18. The speaker array of claim 15, wherein the speaker basket is a first speaker basket, the speaker array further comprising:
a second speaker basket for mounting of a second speaker assembly through an opening in the speaker basket;
the second speaker assembly comprising:
a second voice coil;
a third rigid conductive structure comprising (i) a third input terminal rigidly coupled to a third output of the PCB, (ii) a third output terminal configured to couple to a first input of the second voice coil, and (iii) a third connection element that electrically connects the third input terminal to the third output terminal, the third connection element molded into the second speaker basket around at least a first portion of the opening in the second speaker basket; and
a fourth rigid conductive structure comprising (i) a fourth input terminal rigidly coupled to a fourth output of the PCB, (ii) a fourth output terminal configured to couple to a second input of the second voice coil, and (iii) a fourth connection element that electrically connects the fourth input terminal to the fourth output terminal, the fourth connection element molded into the second speaker basket around at least a second portion of the opening in the second speaker basket.

19. The speaker array of claim 17, wherein the first speaker assembly further comprises:
a speaker cone having an inner rim and an outer rim, wherein the inner rim coupled to the first voice coil and the outer rim coupled to the speaker basket via a surround; and
a spider coupling the first voice coil to the speaker basket.

20. The speaker array of claim 18, wherein the traces of the PCB further comprise:
- a third signal route comprising the third output of the PCB and a third input of the PCB, wherein the third input of the PCB is configured to be coupled to a third output of the audio source; and
- a fourth signal route comprising the fourth output of the PCB and a fourth input of the PCB, wherein the fourth input of the PCB is configured to be coupled to a fourth output of the audio source, wherein the third signal route and the fourth signal route are configured to transmit a differential audio signal from the audio source to the second speaker assembly.

\* \* \* \* \*